United States Patent
Tanaka (10) Patent No.: US 8,797,355 B2
(45) Date of Patent: Aug. 5, 2014

(54) INFORMATION PROCESSING DEVICE AND METHOD OF PROCESSING INFORMATION

(75) Inventor: Yasumi Tanaka, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 13/218,046

(22) Filed: Aug. 25, 2011

(65) Prior Publication Data

US 2012/0050326 A1    Mar. 1, 2012

(30) Foreign Application Priority Data

Aug. 26, 2010    (JP) ................................. 2010-189458

(51) Int. Cl.
     *G09G 5/00*      (2006.01)
(52) U.S. Cl.
     USPC .......................................... 345/633; 345/629
(58) Field of Classification Search
     USPC ................................................. 345/629, 633
     See application file for complete search history.

(56) References Cited

U.S. PATENT DOCUMENTS

| 7,663,649 B2 * | 2/2010 | Takemoto et al. ............ 345/633 |
| 8,311,275 B1 * | 11/2012 | Berlic et al. .................. 382/103 |
| 2002/0075286 A1 * | 6/2002 | Yonezawa et al. ............. 345/679 |
| 2005/0234333 A1 * | 10/2005 | Takemoto et al. ............. 600/426 |
| 2007/0273644 A1 * | 11/2007 | Mondine Natucci ......... 345/156 |
| 2008/0030461 A1 * | 2/2008 | Matsui et al. .................. 345/156 |

FOREIGN PATENT DOCUMENTS

| JP | 2001-092995 A | 4/2001 |
| JP | 2003-150599 A | 5/2003 |
| JP | 2006-072667 A | 3/2006 |
| JP | 2007-042055 A | 2/2007 |
| JP | 2007-172596 A | 7/2007 |

\* cited by examiner

*Primary Examiner* — Maurice L McDowell, Jr.
(74) *Attorney, Agent, or Firm* — Canon U.S.A., Inc. IP Division (57) ABSTRACT

A method and apparatus adapted to input a position and orientation of a viewpoint in an image in MR space obtained by superimposing a first virtual object to be displayed on a display of a real space; to input a position and orientation of the real object; to calculate an amount of change in a relative orientation between the orientation of the viewpoint and the orientation of the real object; to switch a first virtual object to be displayed to a second virtual object to be displayed which is different from the first virtual object to be displayed when the amount of change exceeds a predetermined threshold; and to output an image in the MR space obtained by superimposing the second virtual object to be displayed on the display of the real space in accordance with the position and orientation of the viewpoint and the position of the real object.

20 Claims, 6 Drawing Sheets

INFORMATION PROCESSING DEVICE AND METHOD OF PROCESSING INFORMATION

BACKGROUND OF THE INVENTION

1. Field of the Invention

The present invention relates to an information processing device and a method of processing information. More specifically, the present invention relates to an information processing device and a method of processing information capable of switching and displaying virtual objects to be displayed as an image in a mixed reality space.

2. Description of the Related Art

In related art, a viewer typically views a display when virtual information, such as multiple pages of text and image-including text, is to be displayed. The viewer uses a device, such as a mouse, a keyboard, a button and a touch panel, for the switching of virtual pages.

Recently, intensive studies have been made on mixed reality (MR) to achieve a seamless combination of a real space and a virtual space. An image display device which displays an image in the mixed reality space in the mixed reality includes, for example, the following configuration. That is, the image display device displays an image obtained by drawing an image in a virtual space generated depending on a position and orientation of an capture device on an image in a superimposed manner such that each of virtual objects is superimposed on each of real objects existing in the real space detected in accordance with an image in the real space picked up by the capture device, such as a video camera. Examples of the images in the virtual space include a virtual object and text information which are drawn using computer graphics. Examples of the image display device include a head mount display (HMD).

The image display device may also be implemented in an optical see-through system in which an image in a virtual reality space generated depending on a position and orientation of the viewpoint of the viewer is displayed on an optical see-through display which is mounted on the viewer's head.

Applications of such an image display device include: an operation aid system in which a view inside a patient's body is displayed on the body surface in a superimposed manner; and a mixed reality game system in which a player does a battle with imaginary enemies floating in the real space. Other exemplary application is: a navigation system in which names and guidance of, for example, famous buildings included in an image in a real space obtained by picking up urban areas are displayed in a superimposed manner as a virtual space image; and a landscape simulation system in which, for example, a computer graphics image of a building which is due to be built on an image obtained by picking up a planned construction site of a building is displayed in a superimposed manner.

For example, Japanese Patent Laid-Open No. 2001-92995 discloses an approach to display an electronically generated image and/or text in relation to a paper sheet of a real world. The display of the image and text which are related to the paper sheet can be moved by a user who moves a finger as a mouse pointer. In particular, an approach to use a paper sheet as a related art display, such as a CRT display and a liquid crystal display, using a mechanism of the mixed reality is disclosed.

This approach, however, requires a complicated process of recognizing, in accordance with an image, what operation and behavior of the finger has been made on which position of the paper sheet; therefore there is a problem that the displayed content is difficult to be changed.

SUMMARY OF THE INVENTION

The present invention facilitates easy switching of multiple pieces of virtual information by a viewer.

An information processing device includes: a first input unit which inputs a position and orientation of a viewpoint at which an image in mixed reality space obtained by superimposing a first virtual object to be displayed on a display of a real space is viewed; a second input unit which inputs a position and orientation of a real object which exists in a real space; a calculation unit which calculates a relative orientation between the orientation of the viewpoint and the orientation of the real object; a switching unit which switches the first virtual object to be displayed to a second virtual object to be displayed which is different from the first virtual object to be displayed when an amount of change in the relative orientation exceeds a predetermined threshold; and an output unit which outputs an image in the mixed reality space obtained by superimposing the second virtual object to be displayed on the display of the real space in accordance with the position and orientation of the viewpoint and the position of the real object.

A method of processing information includes: a first input process to input a position and orientation of a viewpoint at which an image in mixed reality space obtained by superimposing a first virtual object to be displayed on a display of a real space is viewed; a second input process to input a position and orientation of a real object which exists in a real space; a calculation process to calculate a relative orientation between the orientation of the viewpoint and the orientation of the real object; a switching process to switch the first virtual object to be displayed to a second virtual object to be displayed which is different from the first virtual object to be displayed when an amount of change in the relative orientation exceeds a predetermined threshold; and an output process to output an image in the mixed reality space obtained by superimposing the second virtual object to be displayed on the display of the real space in accordance with the position and orientation of the viewpoint and the position of the real object.

A storage medium in which a program to let a computer execute each process of the method of processing information.

Further features of the present invention will be apparent from the following description of exemplary embodiments with reference to the attached drawings.

BRIEF DESCRIPTION OF THE DRAWINGS

FIG. 6 is a diagram illustrating an example of measuring, in accordance with a picked-up image of a first modification, an area of the real object which a viewer is in contact with.

DESCRIPTION OF THE EMBODIMENT

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration

Figure 1:
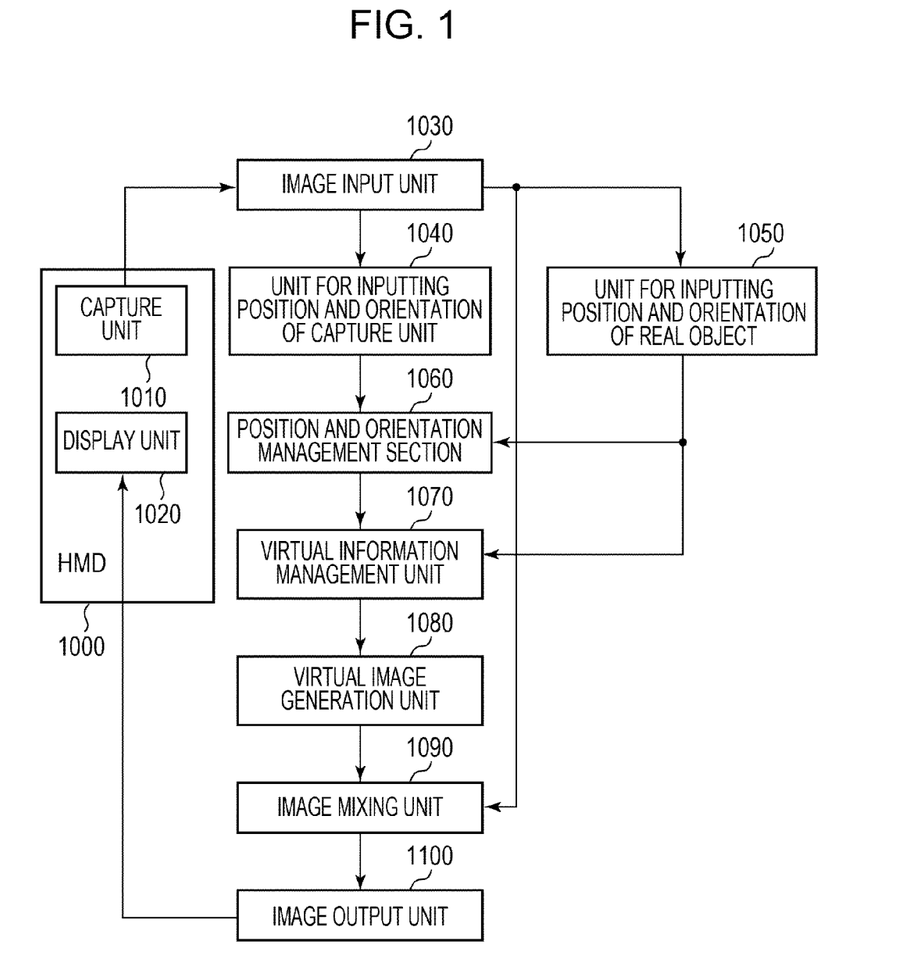
FIG. 1 is a block diagram illustrating a schematic structure of a virtual object operation device according to a first embodiment.
Figure 2:
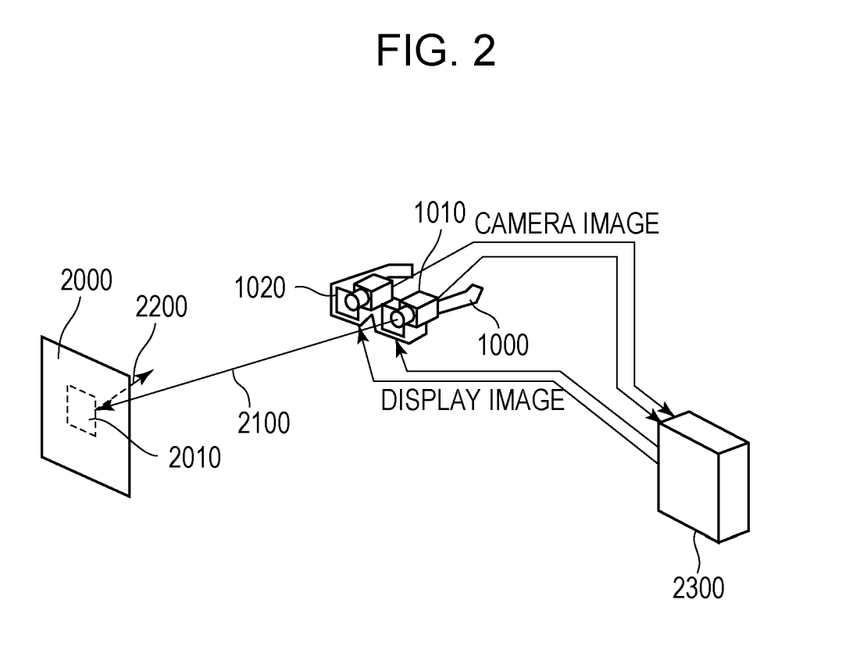
FIG. 2 is a schematic diagram of a configuration of an information processing device according to the first embodiment.

FIG. 1 illustrates a schematic structure to which manipulation of a real object in mixed reality is applied according to the present embodiment. FIG. 2 is a schematic diagram of a configuration of an apparatus according to the present embodiment.

A capture unit 1010 and a display unit 1020 are mounted on and fixed to a HMD 1000. In the present embodiment, as illustrated in FIG. 2, two capture units 1010 and two display units 1020 are mounted on the HMD. This allows picking up an image in the real space and displaying an image of mixed reality in a mixed reality space stereoscopically. A viewer who mounts this HMD 1000 on the head can view the stereoscopic image in the mixed reality space (hereinafter, "MR image") displayed on the display unit 1020. The present embodiment is not limited to the stereoscopic capture and display of an image but can be implemented in a configuration provided with at least one capture unit and at least one display unit. An optical see-through HMD can be used as well as the video see-through HMD. The present embodiment is not limited to the use of the HMD 1000 but can be implemented by a configuration provided with no capture unit 1010. The HMD 1000 performs transmission and reception of data, such as a camera image and a display image, with an external workstation 2300. The workstation 2300 is not limited to the external workstation but may be incorporated as a function of the HMD 1000.

An image input unit 1030 inputs, as image data which captured by the capture unit 1010.

An input for inputting position and orientation of the capture unit 1040 (first input unit) performs image processing in accordance with the picked-up image obtained by the image input unit 1030 and inputs a position and orientation obtained by measuring the position and orientation of capture unit. In particular, the unit for inputting position and orientation of the capture unit 1040 measures the position and orientation from a viewpoint which is common in the real space, virtual space and mixed reality space and inputs the measured value. Here, the method disclosed in of Japanese Patent Laid-Open No. 2007-172596 may be used. The measurement may be carried out using feature points of which positions in the real space are known or correcting sensor errors by estimation. The unit for inputting position and orientation of the capture unit 1040 is not limited to be involved in processing images; but may be involved in image recognition processing. Alternatively, values measured by a measuring device which is capable of measuring a position and orientation of the capture unit, such as a magnetic sensor and an optical sensor, may be input in the unit for inputting position and orientation of the capture unit 1040.

An input for inputting the position and orientation of the real object 1050 (second input unit) performs image processing in accordance with a picked-up image obtained by the image input unit 1030, measures the position and orientation or the orientation of a real object existing in the real space and input the measurement value. Here, a method disclosed in Japanese Patent Laid-Open No. 2007-172596 may also be used. The measurement of the position and orientation of the real object by image processing may be performed using a planar object obtained by printing a marker 2010 on a real object 2000 which is, for example, a sheet of paper or card. The unit for inputting the position and orientation of the real object 1050 is not limited to be involved in processing images; but may be involved in image recognition processing. Alternatively, values measured by a measuring device which is capable of measuring a position and orientation of the capture unit, such as a magnetic sensor and an optical sensor, may be input in the unit for inputting the position and orientation of the real object 1050.

Figure 3:
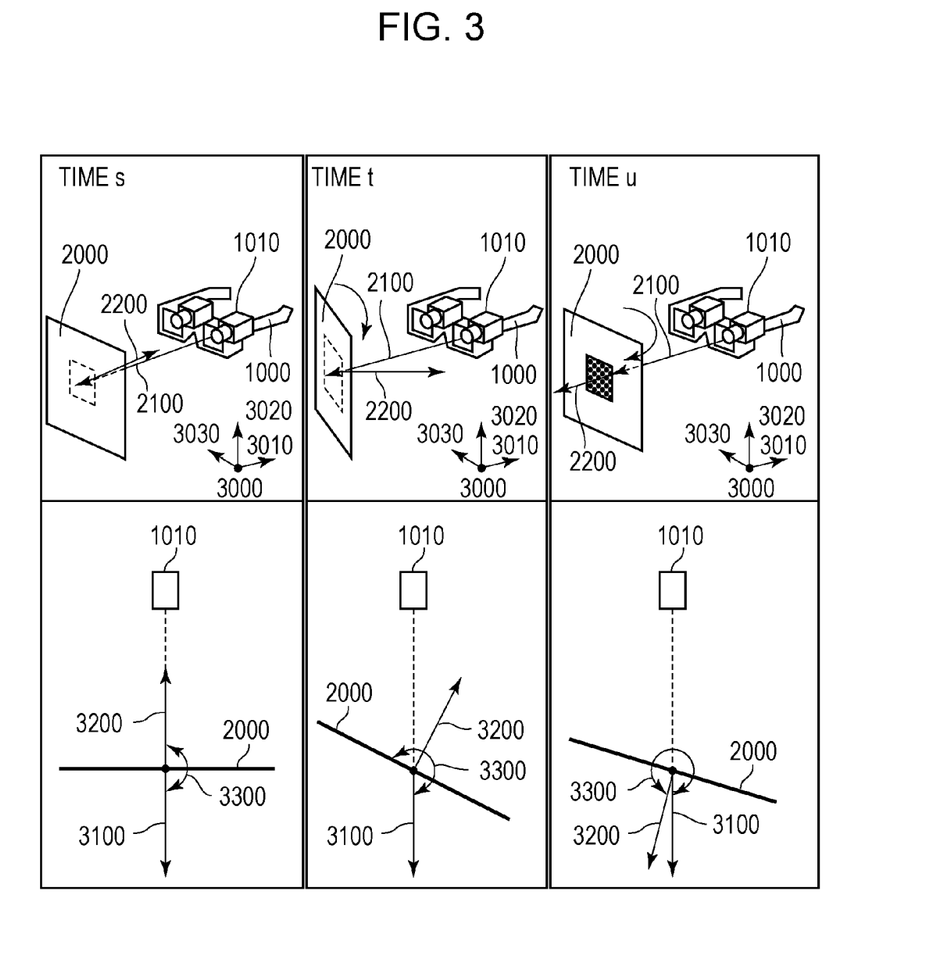
FIG. 3 is a diagram illustrating a change in orientation of a real object according to the first embodiment.

FIG. 3 illustrates a change in the orientation of the real object according to the present embodiment.

A vector direction 2100 and a normal direction 2200 are stored in the position and orientation management unit 1060: the vector direction 2100 is defined between a position obtained from the unit for inputting position and orientation of the capture unit 1040 and a position obtained from the unit for inputting the position and orientation of the real object 1050 at time s designated by a viewer or a system; and the normal direction 2200 is a normal direction of a real object 2000.

A vector direction 2100 and the normal direction 2200 are stored in the position and orientation management unit 1060: the vector direction 2100 is defined between a position obtained from the unit for inputting position and orientation of the capture unit 1040 and a position obtained from the unit for inputting the position and orientation of the real object 1050 at time t which is later than time s and is designated by a viewer or a system.

A vector direction 2100 and the normal direction 2200 are stored in the position and orientation management unit 1060: the vector direction 2100 is defined between a position obtained from the unit for inputting position and orientation of the capture unit 1040 and a position obtained from the unit for inputting the position and orientation of the real object 1050 at time u which is later than time t and is designated by a viewer or a system.

Here, a world coordinate system is defined with a point 3000 being an origin, an axis 3030 being an x axis, an axis 3020 being a y axis and an axis 3010 being a z axis. In addition to arbitrary time designated by the viewer or the user, the position and orientation of the real object and the position and orientation of the capture unit may be stored at constant intervals since the operation of the system is started.

A position and orientation management unit 1060 calculates an angle 3300 between a vector direction 3100 (unit vector) and a normal direction 3200 seen from above at multiple times, such as time s, t and u.

If an amount of change in the angle 3300 exceeding a threshold, from the state where the angle 3300 ranges from more than or equal to 90 degrees to less than or equal to 180 degrees to the state where the angle 3300 ranges from more than or equal to 270 degrees to less than 360 degrees or ranges from more than or equal to 0 degrees to less than 90 degrees, is detected at multiple times, the position and orientation management unit 1060 issues an event A and sends it to a virtual information management unit 1070.

If an amount of change in the angle 3300 exceeding a threshold, from the state where the angle 3300 ranges from more than or equal to 180 degrees to less than or equal to 270 degrees to the state where the angle 3300 ranges from more than or equal to 270 degrees to less than 360 degrees or ranges from more than or equal to 0 degrees to less than 90 degrees, is detected at multiple times, the position and orientation management unit 1060 issues an event B and sends it to a virtual information management unit 1070.

As described above, the position and orientation management unit 1060 calculates the amount of change in the orientation of the real object at multiple times. Then the position and orientation management unit 1060 makes a conditional judgment on the calculation result, issues the result under the condition as an event, and sends the event to the virtual information management unit 1070. In certain embodiments, the relative orientation of the real object can be determined, and compared to a threshold value or range of values to trigger an event. This may be indicated by an angular or rotational change which crosses a threshold value or range limit. Furthermore, the direction or sense of change may be determined to ascertain a type or class of event. This may be indicated by the sense or sign of change in relative orientation.

Here, the conditions under which the event is issued can be those derived by using at least one of the position and the orientation of the viewer and at least one of the position and the orientation of the real object.

Threshold values for angle 3300 are not limited to 0, 90, 180 and 270 degrees but may be determined in advance. The angle 3300 is not limited to that seen from above. Although the angle 3300 is defined by an angle of the orientation of the real object fixed at a single axis, conditions in which angles of multiple axes are combined may be prepared.

The virtual information management unit 1070 determines the position and orientation of virtual information which is the virtual object to be displayed in accordance with the position and orientation information of the real object received from the unit for inputting the position and orientation of the real object 1050. The virtual information management unit 1070 switches, in accordance with the event received from the position and orientation management unit 1060, superimposed virtual information from the virtual information which is currently to be displayed (first virtual object to be displayed) to other virtual information (second virtual object to be displayed). The switching of the virtual information is performed in accordance with the order or arrangement direction, i.e., a forward direction and a reverse direction, of multiple pieces of sequentially arranged virtual information. For example, if the virtual information is multiple pages of text, such as electronic documents or book information, the virtual information management unit 1070 switches the current information, e.g., information on page 10, to information on page 11 upon reception of event A. Upon reception of event B, the virtual information management unit 1070 switches the virtual information in the reverse direction: for example, the current virtual information, e.g., information on page 10 is switched to information on page 9.

A virtual image generation unit 1080 generates a virtual image in accordance with data received from the unit for inputting position and orientation of the capture unit 1040 and the virtual information management unit 1070. Note that the virtual image generation unit 1080 may also generate a virtual image in accordance with the positions and orientations of the capture unit and the real object not in accordance with the unit for inputting position and orientation of the capture unit 1040 but in accordance with the position and orientation management unit 1060. In this manner, the virtual image in which virtual information follows the position and orientation of the real object can be generated.

An image mixing unit 1090 mixes images obtained from the image input unit 1030 and the virtual image generation unit 1080.

An image output unit 1100 transfers the mixed image to a display unit 1020. An MR image corresponding to the position of the viewpoint of the viewer is displayed on the display unit 1020 in the HMD 1000. The viewer viewing the MR image can perceive mixed reality; and, at the same time, performs manipulation of the real object in the real space.

In the present embodiment, the image input unit 1030, the unit for inputting position and orientation of the capture unit 1040, the virtual information management unit 1070, the virtual image generation unit 1080, the image mixing unit 1090 and the image output unit 1100 are stored in the workstation 2300 illustrated in FIG. 2. The workstation 2300 is provided with two systems of the image output units for capturing an image of the capture unit in addition to the device of basic configuration. In the present embodiment, in addition to such a workstation, any computer having the same function as that described above may be used.

Procedure

Figure 4:
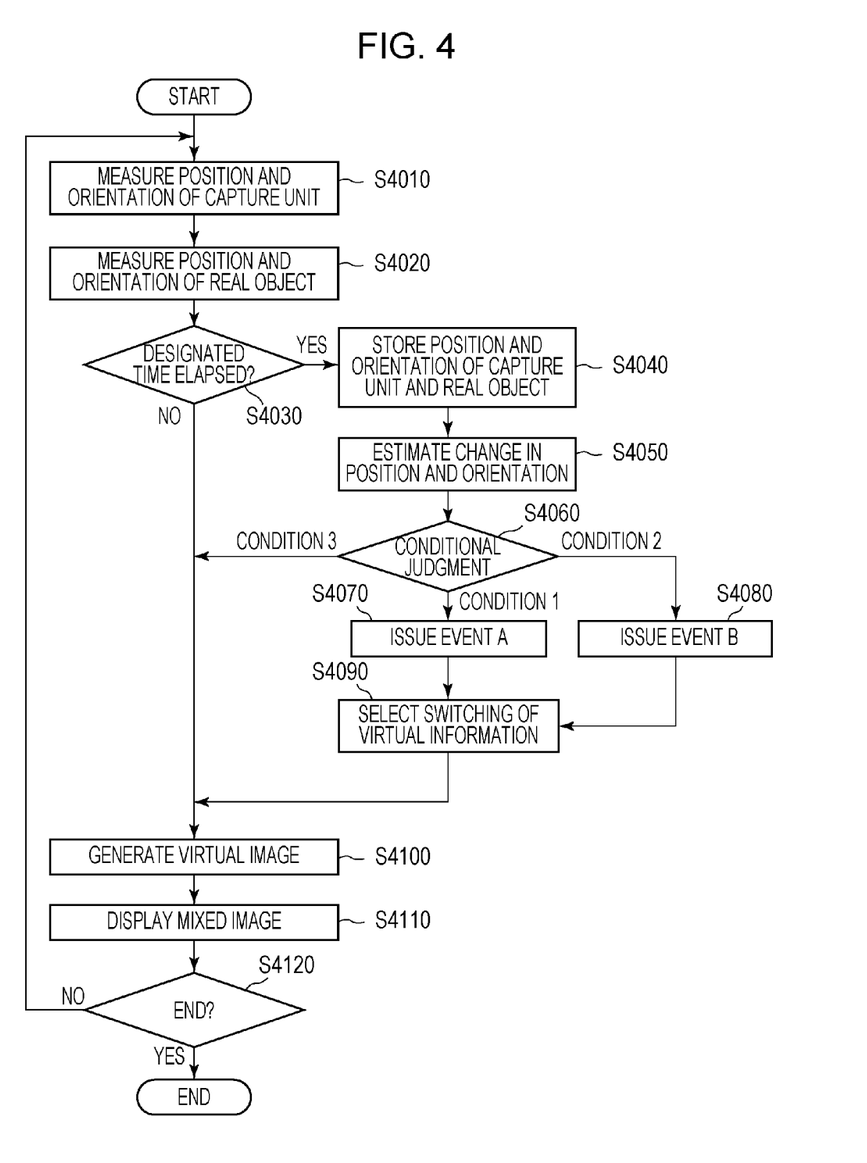
FIG. 4 is a flowchart illustrating a procedure according to the first embodiment.

A procedure according to the present embodiment will be described with reference to a flowchart of FIG. 4. The procedure illustrated in the flowchart of FIG. 4 is repeatedly performed each time an MR image is drawn.

In step S4010, the unit for inputting position and orientation of the capture unit 1040 inputs measurement values of the position and orientation of the capture unit which are input in accordance with the image input by the image input unit 1030.

Similarly, in step S4020, the unit for inputting the position and orientation of the real object 1050 inputs measurement values of the position and orientation of a real object existing in the real space.

In step S4030, if the time designated by the system or the user has elapsed, the procedure proceeds to step S4040. If the time has not elapsed, the procedure proceeds to step S4090. The time herein is not limited to the elapse of time; but may be the time in which a process is repeated at constant or designated time intervals. This allows reducing a possibility that the virtual information to be displayed is switched inadvertently even when, for example, the real object is moved slightly.

In step S4040, the position and orientation of the capture unit and the position and orientation of the real object are stored in the position and orientation management unit 1060.

In step S4050, the position and orientation of the capture unit and the position and orientation of the real object of the past time which are stored in the position and orientation management unit 1060 are estimated. Then the vector direction 2100 defined between the capture unit and the real object and the normal direction 2200 of a surface of the real object are obtained. Subsequently, an angle 3300 between the vector direction 2100 and the normal direction 2200 is obtained. Similarly, an angle 3300 between the vector direction 2100 and the normal direction 2220 of the current time is obtained.

In step S4060, a conditional judgment is made on the obtained angle to determine whether an event is to be issued. In particular, when the angle 4110 and the angles 4120 are under condition 1, the process proceeds to step S4070; when under condition 2, the process proceeds to step S4080; and when condition 3, the process proceeds to step S4100.

Condition 1 is as follows: if an amount of change in the angle 3300 exceeding a threshold, i.e., the angle 3300 changes from more than or equal to 90 degrees and less than or equal to 180 degrees to more than or equal to 270 degrees and less than 360 degrees or more than or equal to 0 degrees and less than 90 degrees, is detected, an event A is sent to the virtual information management unit 1070.

Condition 2 is as follows: if an amount of change in the angle 3300 exceeding a threshold, i.e., the angle 3300 changes from more than or equal to 180 degrees and less than or equal to 270 degrees to more than or equal to 270 degrees and less than 360 degrees or more than or equal to 0 degrees and less than 90 degrees, is detected, an event B is sent to the virtual information management unit 1070.

Any cases other than conditions 1 and conditions 2 correspond to condition 3. As described above, the angle 3300 is shifted among multiple predetermined angle ranges. The shift of angle ranges is a condition of the switching of the events to be issued.

Here, only the amount of change in the relative orientation (first amount of change) calculated in accordance with the orientation of the capture unit 1010 and the orientation of the real object 2000 (first calculation) is added as the condition. However, it is also possible to calculate (second calculation) an amount of change (second amount of change) of the orientation in the real space of the real object 2000 measured by the unit for inputting the position and orientation of the real object 1050 and prepare a condition in which the calculated second amount of change is combined with the first amount of change. In particular, a further condition may be set in conjunction with a case in which the amount of change in the orientation of the real object 2000 in the real space exceeds a constant threshold in addition to condition 1 and condition 2. This allows reducing a possibility that the virtual information is switched inadvertently when, for example, the viewer's head with the HMD mounted thereon is moved.

In step S4070, event A is issued.

In step S4080, event B is issued.

In this manner, the amount of change in the orientation of the real object is calculated. Then conditional judgment is made on the calculation result and the result under the condition is issued as an event.

In step S4090, the virtual information of the virtual information management unit 1070 is switched to the virtual information to be displayed. When event A is received, the arrangement direction of the virtual information is switched to forward direction. When event B is received, the arrangement direction of the virtual information is switched to reverse direction.

In particular, arrangement of the multiple pieces of virtual information stored in the virtual information management unit 1070 is determined in advance. When the virtual information corresponds to the conditions, the arrangement direction of the virtual information is determined to be either of the forward direction or the reverse direction. Among multiple pieces of virtual information, switching is made to virtual information situated in the determined direction from the virtual information to be currently displayed.

In step S4100, the virtual image generation unit 1080 generates a virtual image in accordance with virtual information to be displayed which is stored in the virtual information management unit 1070.

In step S4110, the picked-up image obtained in step S4100 is superimposed on the virtual image obtained in step S4100 and the image output unit 1100 displays the superimposed image in the display unit 1020.

In step S4120, it is determined whether or not the displaying process is ended. If it is determined that the process is to be continued, the process returns to step S4010 and the display process is repeated.

In the related art approach, one piece of virtual information is assigned to each of markers with different identification features, such as the pattern of the marker to be picked up in order to display multiple pieces of virtual information in mixed reality and the marker is picked up to thereby display the virtual information assigned to the marker. This means that the virtual information can be switched only by the switching of the picked up marker to another marker.

According to the embodiment described above, the amount of change in the positions and orientations of the real object and the HMD is detected; therefore the virtual object assigned to the marker of the same identification feature can be switched easily.

Figure 5:
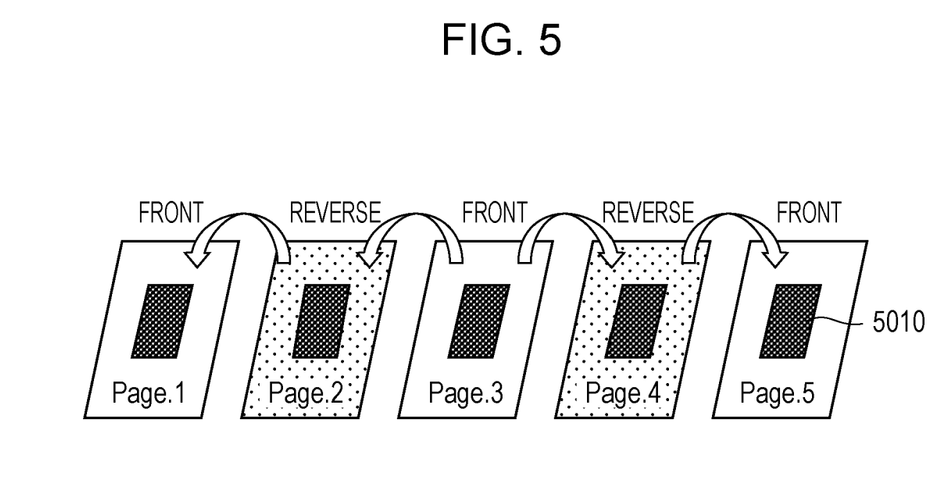
FIG. 5 illustrates switching of pages through manipulation of a real object according to the first embodiment.

FIG. 5 illustrates switching of pages through manipulation of a real object.

For example, a marker 5010 is printed on each of both sides of, for example, a paper sheet as illustrated in FIG. 5. By picking up the marker 5010, turning over of the front side and the reverse side of the paper sheet, which is the change in the orientation of the real object, can be detected and the pages, which are the pieces of virtual information, can be switched. The real object is not limited to the paper sheet but other materials including wood, resin or metal may be used. An aspect of the invention may be directed to a system including a an information processing device in combination with a real object having a particular configuration, and adapted to interact with the information processing device as described herein.

First Modification

Figure 6:
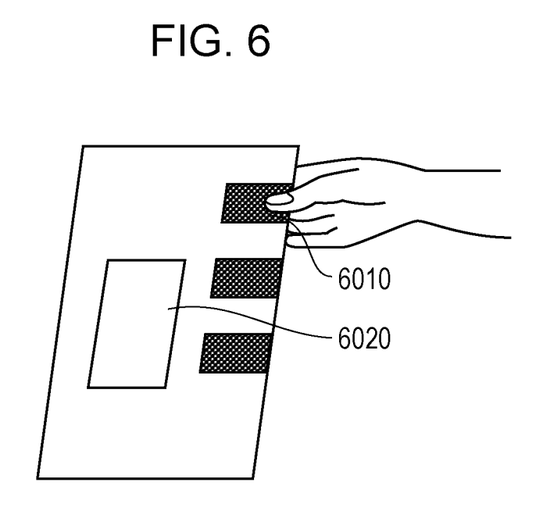

FIG. 6 is a diagram illustrating an example of measuring, in accordance with a picked-up image of a first modification, an area of the real object which a viewer is in contact with. In the first embodiment described above, the position and orientation management unit 1060 performs a calculation in accordance with the position and orientation of the capture unit and the position and orientation of the real object. It is also possible that, as illustrated in FIG. 6, if the viewer holds a specific area of the real object, the position of the area may be measured in accordance with the image input from the image input unit 1030, and the information may be sent to the virtual information management unit 1070.

As a result, if an area 6010 illustrated in FIG. 6 is held by the viewer, which is a situation under conditions 1, and the event A is issued, the virtual information is switched to the forward direction by an arbitrary number to perform the switching. If the area 6010 is held by the viewer, which is a situation under conditions 2, and event B is issued, the virtual information is switched to the reverse direction by an arbitrary number to perform the switching.

Alternatively, the virtual information may be switched to the virtual information on an arbitrary page designated by the user or the system. The amount of turning over of the page may be determined, for example, for each of the specific areas of the real object which the viewer holds. In particular, the amount of turning over of the pages may be determined to be 1 page, 10 pages and 100 pages depending on the change in the orientation of the real object.

As described above, the switched virtual object is generated in accordance with the position of the marker 6020 and is superimposed on the display of the real space.

Second Modification

Figure 7:
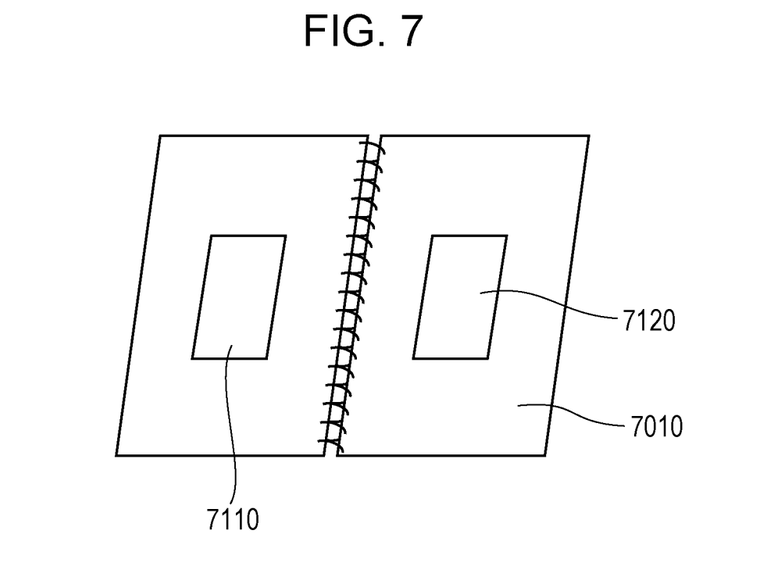
FIG. 7 is a diagram illustrating an example of a real object according to a second modification.

Different virtual objects can be displayed in a desired spatial arrangement in certain embodiments. For example, in the first embodiment described above, the real object 2000 may be a booklet 7010 as illustrated in FIG. 7. The booklet consists of a bundle of multiple constituents of the real object as illustrated in FIG. 5. The same process as that for the real object according to the first embodiment is performed to each of the multiple constituents. When the viewer continues turning over the pages of the booklet, even if once-displayed markers 7110 and 7120 representing the virtual objects are detected again, virtual information different from those represented with respect to the same markers, for example, different pages, can be displayed.

In particular, two sheets of paper or a single folded sheet of paper may be used. Such a configuration can reduce the volume of the booklet while keeping the physical feeling of turning over the booklet with many pages.

If the real object has a fixed folding portion as in the booklet, an operation range of each of multiple constituents of the booklet with respect to the rest of the constituents may be defined. With this configuration, an axis for the calculation of the amount of change in the orientation of the real object is fixed to, for example, the folded portion and thereby the change can be detected further easily.

Third Modification

The first modification and the second modification may be combined. For example, virtual information which the viewer wants to view can be displayed easily without the need of repeated turning over of the booklet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

This application claims the benefit of Japanese Patent Application No. 2010-189458 filed on Aug. 26, 2010, which is hereby incorporated by reference herein in its entirety.

What is claimed is:

1. An information processing device comprising:
   a first obtaining unit configured to obtain a position and orientation of a viewpoint of an imaging apparatus which images a real space;
   a second obtaining unit configured to obtain a position and orientation of a real object which exists in the real space;
   a calculation unit configured to calculate a relative orientation between the viewpoint of the imaging apparatus and the real object;
   a switching unit configured to switch a first virtual object to be displayed to a second virtual object to be displayed which is different from the first virtual object to be displayed when an amount of change in the relative orientation exceeds a predetermined threshold; and
   an output unit configured to output a representation of the second virtual object to be displayed, to be superimposed on the view of the real space in accordance with the position and orientation of the viewpoint and the position of the real object.

2. The information processing device according to claim 1, further comprising an image input unit which inputs a captured image obtained by imaging the real space with an image capture device, wherein:
   the first obtaining unit inputs the position and orientation of the image capture device as the position and orientation of the viewpoint; and
   the output unit outputs an image by superimposing a representation of the second virtual object to be displayed on the captured image.

3. The information processing device according to claim 2, further comprising an image capture device which images the real object in the real space, wherein the image input unit inputs the captured image obtained from the image capture device.

4. The information processing device according to claim 2, wherein the first obtaining unit inputs the position and orientation of the viewpoint which are measured in accordance with a recognition result of the captured image.

5. The information processing device according to claim 1, wherein the second obtaining unit inputs the position and orientation of the real object which are measured in accordance with the recognition result of the captured image.

6. The information processing device according to claim 1, wherein the calculation unit calculates an angle between a vector direction defined between the viewpoint and the real object, and a normal direction with respect to a surface of the real object as the relative orientation.

7. The information processing device according to claim 1, wherein: the first virtual object to be displayed and the second virtual object to be displayed are included in a set of multiple virtual objects to be displayed, said set arranged in a defined order.

8. The information processing device according to claim 7, wherein the switching unit selects either one of a forward direction or a reverse direction depending on the relative orientation; and switches between virtual objects in said set according to the defined order of objects in the set and the selected direction.

9. The information processing device according to claim 7, wherein the first virtual object to be displayed and the second virtual object to be displayed represent different pages of a document.

10. The information processing device according to claim 7, wherein the second virtual object to be displayed is a virtual object to be displayed arranged next to the first virtual object to be displayed.

11. The information processing device according to claim 1, wherein, if the amount of change in the relative orientation calculated by the calculation unit exceeds a predetermined threshold and the amount of change in the orientation of the real object calculated by the object determination means exceeds a predetermined threshold, the switching unit switches the first virtual object to be displayed to a second virtual object to be displayed which is different from the first virtual object to be displayed.

12. The information processing device according to claim 1 wherein the real object is a planar object.

13. The information processing device according to claim 1, wherein:
the real object comprises multiple constituents;
the second obtaining unit inputs each of the orientations of the multiple constituents; and
the calculation unit calculates an amount of change in relative orientation between the viewpoint and the constituents with respect to each of the multiple constituents.

14. The information processing device according to claim 13, wherein the real object is a booklet comprising multiple pages.

15. The information processing device according to claim 13, wherein an operation range of each of multiple constituents with respect to the rest of the constituents is defined.

16. The information processing device according to claim 1, wherein the output unit outputs an image in which a representation of the second virtual object to be displayed is superimposed on a view of the real space in accordance with the position and orientation of the viewpoint and the position and orientation of the real object.

17. The information processing device according to claim 1, further comprising a display unit which displays the output image in the mixed reality space.

18. A method for superimposing a virtual object in a view of a real scene, wherein a real object is identified in the scene, a relative orientation of the real object with respect to a viewpoint is determined, and a first virtual object is rendered in accordance with said determined relative orientation, the method comprising:
detecting a change in said relative orientation exceeding a threshold,
selecting a second, different, virtual object based on the direction of change and the first virtual object, in response to the detected change; and
rendering said second virtual object in place of said first virtual object.

19. A non-transitory storage medium in which a program comprising instructions which, when executed by a computer, cause the computer to perform the method of claim 18.

20. A method comprising:
obtaining a position and orientation of a viewpoint of an imaging apparatus which images a real space;
obtaining a position and orientation of a real object which exists in the real space;
calculating a relative orientation between the viewpoint of the imaging apparatus and the real object;
switching a first virtual object to be displayed to a second virtual object to be displayed which is different from the first virtual object to be displayed when an amount of change in the relative orientation exceeds a predetermined threshold; and
supplying a representation of the second virtual object to be displayed, to be superimposed on the view of the real space in accordance with the position and orientation of the viewpoint and the position of the real object.

* * * * *